(12) United States Patent
Edgar et al.

(10) Patent No.: US 8,582,830 B2
(45) Date of Patent: Nov. 12, 2013

(54) SYSTEM AND METHOD FOR APPLYING A REFLECTANCE MODIFYING AGENT TO CHANGE A PERSONS APPEARANCE BASED ON A DIGITAL IMAGE

(75) Inventors: Albert D. Edgar, Austin, TX (US); David C. Iglehart, Austin, TX (US); Rick B. Yeager, Austin, TX (US)

(73) Assignee: TCMS Transparent Beauty LLC, Austin, TX (US)

( * ) Notice: Subject to any disclaimer, the term of this patent is extended or adjusted under 35 U.S.C. 154(b) by 60 days.

(21) Appl. No.: 13/476,320

(22) Filed: May 21, 2012

(65) Prior Publication Data

US 2012/0230562 A1    Sep. 13, 2012

Related U.S. Application Data (63) Continuation of application No. 12/029,534, filed on Feb. 12, 2008, now Pat. No. 8,184,901.

(60) Provisional application No. 60/889,297, filed on Feb. 12, 2007, provisional application No. 60/889,298, filed on Feb. 12, 2007.

(51) Int. Cl.
*G06K 9/00*        (2006.01)
*G02B 5/20*        (2006.01)
*A61M 35/00*       (2006.01)
*A61B 6/00*        (2006.01)

(52) U.S. Cl.
USPC ........... 382/115; 382/162; 382/209; 604/290; 600/310; 600/473

(58) Field of Classification Search
USPC ......... 382/100, 115–118, 128, 162–167, 209; 382/254, 256, 312; 347/111; 604/290; 359/359; 600/310, 473, 476; 401/118, 401/119
See application file for complete search history.

(56) References Cited

U.S. PATENT DOCUMENTS 4,190,056 A    2/1980  Tapper et al.
4,401,122 A    8/1983  Clark
(Continued)

FOREIGN PATENT DOCUMENTS

CN     101287607 B    9/2010
DE     202004003148 U1    4/2005
(Continued)

OTHER PUBLICATIONS

Examiner Li Yan, Notification of the Third Office Action for Application No. 200880009579.0, dated Jan. 7, 2013, 8 pages.
(Continued)

*Primary Examiner* — Chan S Park
*Assistant Examiner* — Mia M Thomas
(74) *Attorney, Agent, or Firm* — Fish & Richardson P.C.

(57) ABSTRACT

A computer-controlled system determines attributes of a frexel, which is an area of human skin, and applies a reflectance modifying agent (RMA) at the pixel level to automatically change the appearance of human features based on one or more digital images. The change may be based on a digital image of the same frexel, for as seen in a prior digital photograph captured previously by the computer-controlled system. The system scans the frexel and uses feature recognition software to compare the person's current features in the frexel with that person's features in the digital image. It then calculates enhancements to the make the current features appear more like the features in the digital image, and it applies the RMA to the frexel to accomplish the enhancements. Or the change may be based on a digital image of another person, through the application of RMAs.

23 Claims, 8 Drawing Sheets

(56) References Cited

U.S. PATENT DOCUMENTS

| | | | |
|---|---|---|---|
| 4,628,356 A | 12/1986 | Spillman et al. | |
| 4,882,492 A * | 11/1989 | Schlager | 250/346 |
| 5,027,817 A * | 7/1991 | John | 600/431 |
| 5,156,479 A | 10/1992 | Iizuka | |
| 5,241,468 A | 8/1993 | Kenet | |
| 5,836,872 A * | 11/1998 | Kenet et al. | 600/306 |
| 5,931,166 A | 8/1999 | Weber et al. | |
| 6,021,344 A | 2/2000 | Lui et al. | |
| 6,067,996 A * | 5/2000 | Weber et al. | 132/73 |
| 6,111,653 A * | 8/2000 | Bucknell et al. | 356/446 |
| 6,122,042 A | 9/2000 | Wunderman et al. | |
| 6,151,031 A * | 11/2000 | Atkins et al. | 345/441 |
| 6,208,749 B1 | 3/2001 | Gutkowicz-Krusin et al. | |
| 6,250,927 B1 | 6/2001 | Narlo | |
| 6,286,517 B1 * | 9/2001 | Weber et al. | 132/73 |
| 6,292,277 B1 * | 9/2001 | Kikinis | 359/9 |
| 6,293,284 B1 | 9/2001 | Rigg | |
| 6,295,737 B2 | 10/2001 | Patton et al. | |
| 6,312,124 B1 | 11/2001 | Desormeaux | |
| 6,341,831 B1 * | 1/2002 | Weber et al. | 347/1 |
| 6,436,127 B1 * | 8/2002 | Anderson et al. | 607/89 |
| 6,487,440 B2 | 11/2002 | Deckert et al. | |
| 6,502,583 B1 | 1/2003 | Utsugi | |
| 6,543,893 B2 * | 4/2003 | Desormeaux | 347/109 |
| 6,554,452 B1 * | 4/2003 | Bourn et al. | 362/247 |
| 6,575,751 B1 | 6/2003 | Lehmann et al. | |
| 6,578,276 B2 | 6/2003 | Patton et al. | |
| 6,641,578 B2 | 11/2003 | Mukai | |
| 6,706,035 B2 | 3/2004 | Cense et al. | |
| 6,719,467 B2 | 4/2004 | Hess et al. | |
| 7,027,619 B2 * | 4/2006 | Pavlidis et al. | 382/115 |
| 7,233,693 B2 | 6/2007 | Momma | |
| 7,382,400 B2 | 6/2008 | Sablak | |
| 7,602,942 B2 * | 10/2009 | Bazakos et al. | 382/103 |
| 7,890,152 B2 * | 2/2011 | Edgar et al. | 600/310 |
| 8,027,505 B2 * | 9/2011 | Edgar et al. | 382/100 |
| 2001/0040982 A1 | 11/2001 | Kim et al. | |
| 2002/0054714 A1 | 5/2002 | Hawkins et al. | |
| 2002/0064302 A1 | 5/2002 | Massengill | |
| 2002/0081003 A1 | 6/2002 | Sobol | |
| 2002/0105662 A1 | 8/2002 | Patton et al. | |
| 2002/0107456 A1 | 8/2002 | Leveque | |
| 2002/0155069 A1 | 10/2002 | Pruche et al. | |
| 2002/0172419 A1 | 11/2002 | Lin et al. | |
| 2002/0176926 A1 | 11/2002 | Pletcher et al. | |
| 2003/0045799 A1 | 3/2003 | Bazin et al. | |
| 2003/0050561 A1 | 3/2003 | Bazin et al. | |
| 2003/0053685 A1 | 3/2003 | Lestideau | |
| 2003/0060810 A1 | 3/2003 | Syrowicz et al. | |
| 2003/0062058 A1 | 4/2003 | Utsugi | |
| 2003/0063102 A1 | 4/2003 | Rubinstenn et al. | |
| 2003/0067545 A1 | 4/2003 | Giron et al. | |
| 2003/0100837 A1 | 5/2003 | Lys et al. | |
| 2003/0108228 A1 | 6/2003 | Garnier | |
| 2003/0130575 A1 | 7/2003 | Desai | |
| 2003/0208190 A1 | 11/2003 | Roberts et al. | |
| 2003/0223622 A1 | 12/2003 | Simon et al. | |
| 2003/0229514 A2 | 12/2003 | Brown | |
| 2004/0005086 A1 | 1/2004 | Wolff et al. | |
| 2004/0078278 A1 | 4/2004 | Dauga et al. | |
| 2004/0125996 A1 | 7/2004 | Eddowes et al. | |
| 2004/0170337 A1 | 9/2004 | Simon et al. | |
| 2004/0174525 A1 | 9/2004 | Mullani | |
| 2004/0201694 A1 | 10/2004 | Gartstein et al. | |
| 2004/0236229 A1 | 11/2004 | Freeman et al. | |
| 2004/0254546 A1 | 12/2004 | Lefebvre | |
| 2004/0267189 A1 | 12/2004 | Mavor et al. | |
| 2005/0004475 A1 | 1/2005 | Giron | |
| 2005/0010102 A1 | 1/2005 | Marchesini et al. | |
| 2005/0053628 A1 | 3/2005 | Montanari et al. | |
| 2005/0053637 A1 | 3/2005 | Ma Or et al. | |
| 2005/0154382 A1 | 7/2005 | Altshuler et al. | |
| 2006/0153470 A1 | 7/2006 | Simon et al. | |
| 2006/0228037 A1 | 10/2006 | Simon et al. | |
| 2006/0228038 A1 | 10/2006 | Simon et al. | |
| 2006/0228039 A1 | 10/2006 | Simon et al. | |
| 2006/0228040 A1 | 10/2006 | Simon et al. | |
| 2007/0016078 A1 | 1/2007 | Hoyt et al. | |
| 2007/0035815 A1 | 2/2007 | Edgar et al. | |
| 2007/0047761 A1 | 3/2007 | Wasilunas et al. | |
| 2007/0049832 A1 | 3/2007 | Edgar et al. | |
| 2007/0203413 A1 | 8/2007 | Frangioni | |
| 2008/0193195 A1 | 8/2008 | Edgar et al. | |
| 2008/0194971 A1 | 8/2008 | Edgar et al. | |
| 2008/0219528 A1 | 9/2008 | Edgar et al. | |
| 2009/0025747 A1 | 1/2009 | Edgar et al. | |
| 2011/0124989 A1 | 5/2011 | Edgar et al. | |
| 2011/0270200 A1 | 11/2011 | Edgar et al. | |

FOREIGN PATENT DOCUMENTS

| | | |
|---|---|---|
| EP | 1184663 A2 | 3/2002 |
| EP | 1210909 A2 | 6/2002 |
| EP | 1304056 A2 | 4/2003 |
| EP | 1495781 A2 | 1/2005 |
| EP | 1677254 A1 | 7/2006 |
| EP | 1763380 A1 | 3/2007 |
| FR | 2810761 A1 | 12/2001 |
| JP | 59171280 U | 9/1984 |
| JP | 5281041 A | 10/1993 |
| JP | 6201468 A | 7/1994 |
| JP | 11019050 A | 1/1999 |
| JP | 11019051 A | 1/1999 |
| JP | 2000139846 A | 5/2000 |
| JP | 2000331167 A | 11/2000 |
| JP | 2001112722 A | 4/2001 |
| JP | 2002017689 A | 1/2002 |
| JP | 2002263084 A | 9/2002 |
| JP | 2003052642 A | 2/2003 |
| JP | 2003057169 A | 2/2003 |
| JP | 2003057170 A | 2/2003 |
| JP | 2003513735 X | 4/2003 |
| JP | 2003519019 A | 6/2003 |
| JP | 2003210248 A | 7/2003 |
| JP | 2004501707 A | 1/2004 |
| JP | 2004105748 A | 4/2004 |
| JP | 2004315426 A | 11/2004 |
| JP | 2006271654 A | 10/2006 |
| JP | 2007231883 A | 9/2007 |
| JP | 2008526241 A | 7/2008 |
| JP | 2008526284 A | 7/2008 |
| RU | 2336866 C2 | 10/2008 |
| WO | WO0126735 A1 | 4/2001 |
| WO | WO0149360 A1 | 7/2001 |
| WO | WO0177976 A2 | 10/2001 |
| WO | WO2004028420 A1 | 4/2004 |
| WO | WO2004091590 A1 | 10/2004 |
| WO | WO2004095372 A1 | 11/2004 |
| WO | WO2005123172 A1 | 12/2005 |
| WO | WO2006008414 A1 | 1/2006 |
| WO | WO2006074881 A1 | 7/2006 |
| WO | WO2007022095 A1 | 2/2007 |

OTHER PUBLICATIONS

Notice to File a Response in Application No. 10-2008-7006041, dated Jan. 29, 2013, 10 pages.
Chujit Jeamsinkul, "MasqueArray Automatic Makeup Selector/Applicator", Nov. 11, 1998, Rochester Institute of Technology, 79 pages.
Office Action for Japanese Patent Application No. 2009-549296, Apr. 30, 2013, 12 pages.
"Lehrstuhl füOptik 2004 Annual Report" Jun. 2005 (2005-2006), Lehrstuhl Für Optik, Institute Für Optik, Information und Photonik, Max-Planck-Forschungsgruppe, Universität Erlangen-Nürnberg, Erlangen, Germany, XP002460048, 2 pages.
EPO Office Action in App. No. 06 801 295.4, mailed Feb. 3, 2010, 3 pages.
Authorized Officer Nora Lindner, International Preliminary Report on Patentability and Written Opinion of the International Searching Authority for International Application No. PCT/US2006/031441, mailed Feb. 12, 2008, 9 pages.
Russian Official Action (including translation) for Application No. 2008109234, mailed Apr. 2, 2009, 7 pages.

(56) References Cited

OTHER PUBLICATIONS

EPO Office Action in Application No. 06 801 295.4, mailed Jun. 10, 2008, 3 pages.
Authorized Officer Moritz Knupling, International Search Report for International Application No. PCT/US2006/031441, mailed Dec. 7, 2007, 2 pages.
Authorized Officer Lars-Oliver Romich, International Search Report and the Written Opinion for International Application No. PCT/US2006/031441, mailed Dec. 7, 2007, 14 pages.
Notification of the First Office Action (including translation) in Application No. 200680037564.6, mailed Jul. 31, 2009, 7 pages.
Examiner's First Report in Application No. 2006279800, mailed Feb. 2, 2011, 2 pages.
Russian Deputy Chief S.V. Artamonov, Decision on Grant Patent for Invention (including translation) in Application 2008109235, dated Feb. 19, 2009.
Authorized Officer Dorothee Mulhausen, International Preliminary Report on Patentability for International Application No. PCT/US2006/031657, mailed Feb. 12, 2008, 7 pages.
Authorized Officer Laure Acquaviva, Invitation to Pay Additional Fees and, where applicable, Protest Fees International Application No. PCT/US2008/053527, mailed Jul. 7, 2008, 8 pages.
Examiner's First Report in Application No. 2006279652, mailed Jan. 28, 2011, 2 pages.
Notification of the First Office Action (including translation) in Application No. 200680037560.8, mailed Jul. 17, 2009, 8 pages.
EPO Office Action in Application No. 06 789 746.2, mailed Apr. 3, 2009, 3 pages.
Authorized Officer Wolfhard Wehr, International Search Report for International Application No. PCT/US2006/031657, mailed Dec. 20, 2006, 2 pages.
Authorized Officer Athina Nickitas-Etienne, International Preliminary Report on Patentability for International Application No. PCT/US2008/053640, mailed Aug. 19, 2009, 5 pages.
Authorized Officer Michael Eberwein, International Search Report and Written Opinion for International Application No. PCT/US2008/053640, mailed Jun. 3, 2008, 9 pages.
European Patent Office Action for Application No. 08 729 481.5, dated Aug. 23, 2010, 5 pages.
Authorized Officer Jens Clevorn, International Search Report for Application No. PCT/US2008/053528, dated Nov. 13, 2008, 4 pages.
Authorized Officer Jens Clevorn, International Preliminary Report on Patentability and Written Opinion of the International Searching Authority for Application No. PCT/US2008/053528, dated Aug. 11, 2009, 9 pages.
Notification of First Office Action for Application No. 200880009579.0, dated Jul. 14, 2010, 10 pages.
Authorized Officer Simin Baharlou, International Preliminary Report on Patentability and Written Opinion of the International Searching Authority for Application No. PCT/US2008/065168, mailed Dec. 1, 2009, 8 pages.
Anonymous, "Circular Polarizer Films," Internet Article, [Online] 2005, http://www.optigrafix.com/circular.htm [retrieved on Sep. 5, 2008].

Authorized Officer Carlos Nicolas, International Search Report and Written Opinion for Application No. PCT/US2008/065168, mailed Sep. 19, 2008, 13 pages.
Mike Topping et al., "The Development of Handy 1, A Robotic System to Assist the Severely Disabled," ICORR '99, Sixth International Conference of Rehabilitation Robotics, Stanford, CA, Jul. 1-2, 1999, pp. 244-249.
Robot News, "Handy1-Rehabilitation robot for the severely disabled; helping you to eat and drink and brush and even do make-up!", posted on Apr. 3, 2006, http://robotnews.wordpress.com/2006/04/03/handy1-rehabiliation-robot-for-the-severely-disabledhelping-you-to-eat-and-drink-and-brush-and-even-do-make-up/, 6 pages.
Mike Topping, "An Overview of the Development of Handy 1, a Rehabilitation Robot to Assist the Severely Disabled" Journal of Intelligent and Robotic Systems, vol. 34, No. 3, 2002, pp. 253-263.
Notice of Reasons for Rejection for Application No. 2008-526241, dated Aug. 31, 2011, 7 pages.
Notification of the First Office Action (including translation) in Application No. 200880009069.3, mailed Jul. 1, 2011, 8 pages.
EPO Office Action in App. No. 06 801 295.4, mailed Oct. 10, 2011, 5 pages.
Cula O G et al., "Bidirectional Imaging and Modeling of Skin Texture," IEEE Transactions on Biomedical Engineering, IEEE Service Center, Piscataway, NJ, USA, vol. 51, No. 12, Dec. 1, 2004, pp. 2148-2159.
Second Examiner's Report in Application No. 2006279652, mailed Nov. 3, 2011, 2 pages.
Examiner's First Report in Application No. 2008260040, mailed Apr. 13, 2012, 2 pages.
Notice to File a Response in Application No. 10-2008-7006079, dated Aug. 6, 2012, 10 pages.
Notice of Reasons for Rejection for Application No. 2008-526284, dated Apr. 18, 2012, 10 pages.
Notification of the Second Office Action for Application No. 200880009579.0, dated Mar. 1, 2012, 4 pages.
Office Action for Application No. 2009148819, mailed May 30, 2012, 7 pages.
Francois-Xavier Bon et al, "Quantitative and Kinetic Evolution of Wound Healing through Image Analysis," 2000 IEEE Transactions on Medical Imaging, vol. 19, No. 7, Jul. 2000, pp. 767-772.
Divya Railan et al., "Laser Treatment of Acne, Psoriasis, Leukoderma and Scars," Seminars in Cutaneous Medicine and Surgery, Dec. 2008, pp. 285-291.
Robert J. Chiu et al., "Fractionated Photothermolysis: the Fraxel 1550-nm Glass Fiber Laser Treatment," Facial Plastic Surgery Clinics of North America (2007), vol. 15, Issue 2, May 2007, pp. 229-237.
Hans Laubach et al., "Effects of Skin Temperature on Lesion Size in Fractional Photothermolysis," Lasers in Surgery and Medicine, Jan. 2007, pp. 14-18.
Oana G. Cula et al., "Bidirectional Imaging and Modeling of Skin Texture," IEEE Engineering of Medicine and Biology Society, Nov. 2004, pp. 1-6.

\* cited by examiner

SYSTEM AND METHOD FOR APPLYING A REFLECTANCE MODIFYING AGENT TO CHANGE A PERSONS APPEARANCE BASED ON A DIGITAL IMAGE

CROSS-REFERENCE TO RELATED APPLICATIONS

This patent application is a continuation of U.S. application Ser. No. 12/029,534 filed Feb. 12, 2008. This patent application is related to U.S. Provisional Patent Application No. 60/889,297 filed Feb. 12, 2007 by the present inventors for "SYSTEM AND METHOD FOR APPLYING A REFLECTANCE MODIFYING AGENT TO RECONSTRUCT A PERSON'S APPEARANCE BASED ON A DIGITAL IMAGE OF THE PERSON" and claims the filing date of that Provisional application; and is related to U.S. Provisional Patent Application No. 60/889,298 filed Feb. 12, 2007 by the present inventors for "SYSTEM AND METHOD FOR APPLYING A REFLECTANCE MODIFYING AGENT TO ENHANCE A PERSON'S APPEARANCE BASED ON A DIGITAL IMAGE OF ANOTHER PERSON".

This patent application incorporates by reference the specification, drawings, and claims of U.S. patent application Ser. No. 11/503,806 filed Aug. 14, 2006 by the present inventors for "SYSTEM AND METHOD FOR APPLYING A REFLECTANCE MODIFYING AGENT TO IMPROVE THE VISUAL ATTRACTIVENESS OF HUMAN SKIN".

FIELD OF THE INVENTION

The current invention relates to automated computer-controlled methods to selectively and precisely apply one or more reflectance modifying agent, such as a dye or pigment, to human skin as cosmetics to change the appearance of human features based on a model comprising at least one digital image.

BACKGROUND OF THE INVENTION

Prior Cosmetic Techniques and Their Disadvantages

Prior art techniques for modifying the appearance of skin include natural tanning, artificial tanning, and the deliberate application of cosmetics. Each of these prior art techniques has limitations.

Typically, the applications of cosmetic substances to skin are largely manual, for example through the used of brushes, application tubes, pencils, pads, and fingers. These application methods make prior art cosmetics imprecise, labor intensive, expensive, and sometimes harmful, when compared to the computerized techniques of the present invention.

Most prior art cosmetic approaches are based on the application of opaque substances. As explained in the cross-referenced application U.S. Ser. No. 11/503,806, there is a need for the precise computer-controlled application of reflectance modifying agents (RMAs), such as transparent dyes, to provide a more effective modification of appearance. In this specification, the terms "reflectance modifying agent" or "RMA" refer to any compound useful for altering the reflectance of another material, and are explained in further detail below. Some examples of RMA are inks, dyes, pigments, bleaching agents, chemically altering agents, and other substances that can alter the reflectance of human skin and other features. The terms "dye" and "transparent dyes" are used for brevity in this specification to represent any RMA.

Moreover, cosmetics are typically applied manually to make people look more like certain images. For example, cosmetics may be applied to reconstruct the former appearance of people whose features have been altered or damaged. For example, cosmetics may be applied to the skin of patients who have been burned, to make the burned skin appear to have the color and texture it had before the burns. Cosmetics may be used to create the appearance of eyebrows on cancer patients who have lost their hair as a result of chemotherapy or radiation treatment. And cosmetics are used generally to make older people look more like they were when young. In addition, cosmetics may be used to make people look more like any desired model of themselves that they might have.

Typically the models used as the basis for these cosmetic applications are
- People's memories of the way they looked previously.
- Prior images of people, such as photographs, videos, paintings, drawings, and digital images such as those stored on computers, cell phones, and digital cameras.
- Images of people as they would like to be seen, for example in drawings, enhanced photographs, or computer-generated images.

Ideal models derived from certain people are also used as the basis for cosmetic applications on other people. For example, a makeup artist may create a "look," consisting of a certain combination of colors, shading contrasts, and even feature shapes, such as eyebrow shapes, that is used as model for cosmetics applied to many different people. Such a look may be based on the appearance of a popular actress, for example a Nicole Kidman look or a Catherine Zeta-Jones look, because many women would like to look like those actresses. Makeup artists can apply cosmetics to make different people all have a similar look, or individuals may apply their own cosmetics to create such effects, for example based on magazine pictures or digital images of actresses.

However, manual techniques of applying cosmetics for such changes based on images, such as digital images, can be time consuming and require considerable skill to be done well, as anyone can attest who has tried to draw on eyebrows for a distressed cancer patient to match a digital image of her.

Therefore, there is a need for the precise application of reflectance modifying agents (RMAs) to provide a more effective, more automated, faster, less expensive, and less dangerous modification of the appearance of skin to cosmetically change people's features based on digital images.

BRIEF SUMMARY OF THE INVENTION

These and other needs are addressed by the present invention. The following explanation describes the present invention by way of example and not by way of limitation.

It is an aspect of the present invention to automatically change the appearance of human features based on a model digital image.

It is another aspect of the present invention to automatically reconstruct the appearance of human features based on digital images, through the application of RMAs. A useful technique is to employ feature recognition software to compare a person's current features with that person's features in one or more digital images. These images may be previously provided by the present invention's system and method. Or they may be provided by other compatible means. The present invention's enhancement software can then determine reconstructive enhancements based on those digital images and can apply those enhancements to the person precisely and automatically.

It is still another aspect of the present invention to automatically enhance the appearance of a person's features based on a digital image of another person, through the application of RMAs. A useful technique is to employ feature recognition software to compare the person's features with a model person's features in one or more digital images. These images may be previously provided by the present invention's system and method. Or they may be provided by other compatible means. The present invention's software can then determine enhancements based on those digital images and can apply those enhancements to the person precisely and automatically.

These and other aspects, features, and advantages are achieved according to the system and method of the present invention. In accordance with the present invention, a computer-controlled system determines attributes of a frexel, which is an area of human skin, and applies a reflectance modifying agent (RMA) at the pixel level to automatically change the appearance of human features based on one or more digital images.

One embodiment may change the appearance of human features based on one or more digital images of the same frexel, as seen in a prior digital photograph. In an embodiment, the digital images are captured previously by the computer-controlled system. The system scans the frexel and uses feature recognition software to compare the person's current features in the frexel with that person's features in the digital images. It then calculates enhancements to the make the current features appear more like the features in the digital images, and it applies the RMA to the frexel, typically with an inkjet printer, to accomplish the enhancements. The identified attributes in the frexel may relate to reflectance characteristics and to the surface topology of the skin.

Another embodiment may enhance the appearance of a person's features based on a digital image of another person, through the application of RMAs. A useful technique is to employ feature recognition software to compare the person's features with a model person's features in one or more digital images. These images may be previously provided by the present invention's system and method. Or they may be provided by other compatible means. The present invention's software can then determine enhancements based on those digital images and can apply those enhancements to the person precisely and automatically.

BRIEF DESCRIPTION OF THE DRAWINGS

The following embodiment of the present invention is described by way of example only, with reference to the accompanying drawings, in which.

DETAILED DESCRIPTION OF
EMBODIMENT—RECONSTRUCTION PROCESS

The present invention comprises the application or one or more reflectance modifying agents (RMAs) through a computer-controlled system and method to change a person's appearance. For example, the invention may be used to automatically reconstruct the appearance of a person's damaged or altered features, based on the appearance of that person in one or more digital images. To cite another example, the invention may be used to automatically enhance a first person's appearance based on the appearance of second person in a digital image.

U.S. application Ser. No. 11/503,806 filed Aug. 14, 2006 by the present applicants claims the computer-controlled system and method that scans an area of human skin, identifies unattractive attributes, and applies the RMA, typically with an inkjet printer, to improve the appearance of that area of skin. The present invention comprises new innovations to that system and method to accomplish the changes mentioned above.

Enhancement System

Figure 1:
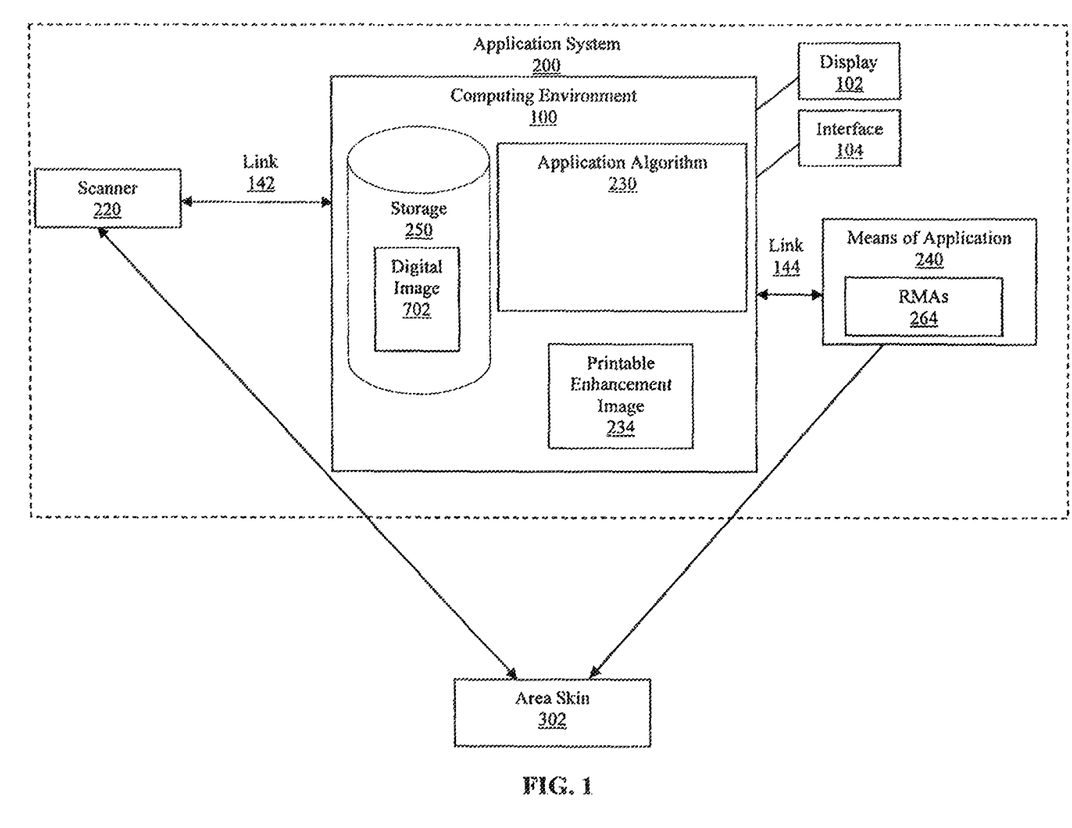
FIG. 1 is a block diagram that illustrates an enhancement system for using a model digital image to change a person's appearance.

FIG. 1 illustrates an embodiment of a system for changing the appearance of features using the cosmetic system explained with reference to FIG. 1 in the cross-referenced application U.S. Ser. No. 11/503,806. FIG. 1 in the present application shows the incorporation of the new element of at least one previously stored digital image 702 that is used as a model for changing a person's appearance.

Frexels

In this patent specification, the term "frexel" is defined as a small pixel-like region of the skin. A frexel might correspond to a small portion of a freckle or other skin feature, or it may correspond to an area of the skin that does not have special features. A frexel thus refers to skin rather than to an independent coordinate system. The term frexel is used to suggest that what is being measured is on a 3-D surface rather than a flat surface.

Reconstruction System

Figure 2:
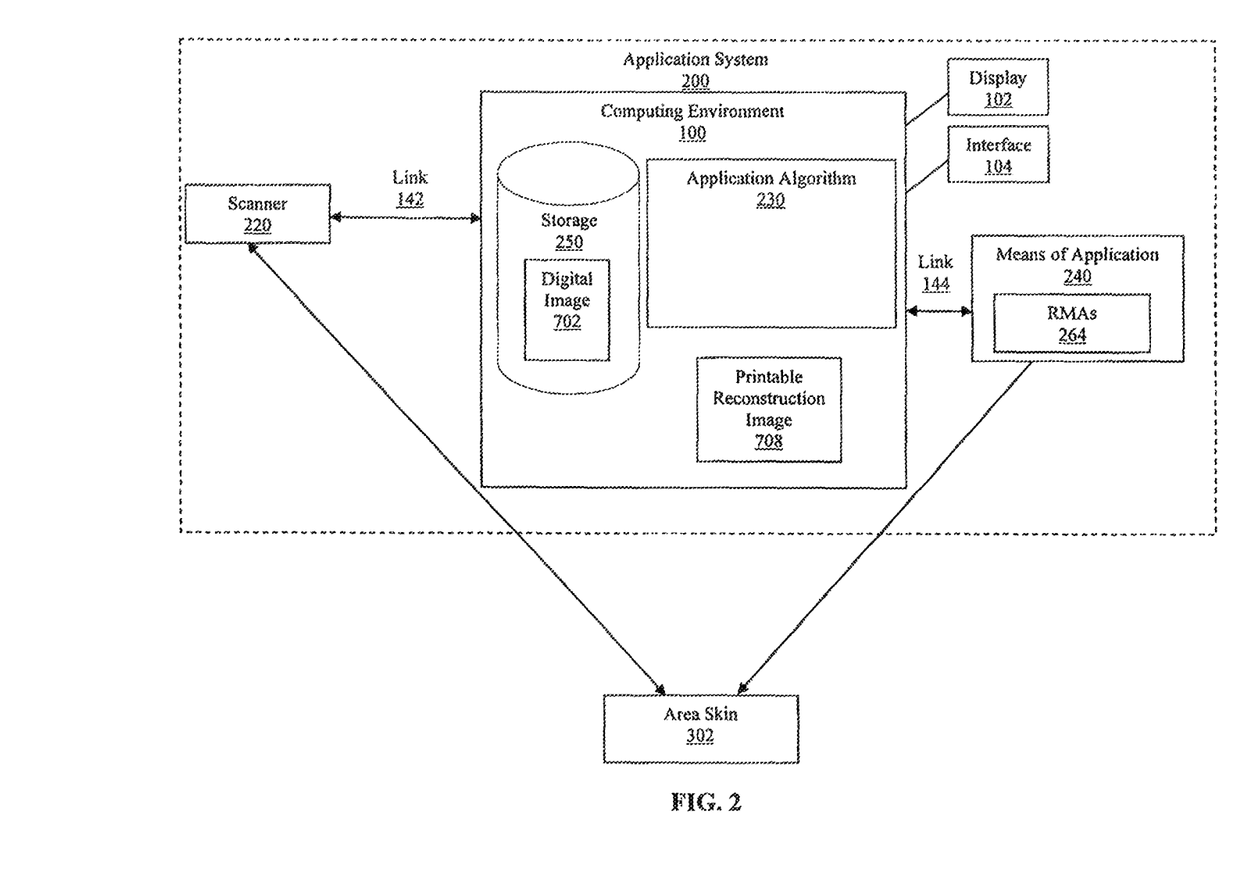
FIG. 2 is a block diagram that illustrates a reconstruction system comprising additional means of obtaining prior digital image.

FIG. 2 illustrates an embodiment of a system for changing the appearance of features using the cosmetic system explained with reference to FIG. 48 in the cross-referenced application U.S. 60/889,297. In FIG. 2, the stored digital image 702 may be a previous digital image of a person whose feature or features are to be reconstructed. In an embodiment, this digital image 702 may be one obtained through the system and method of the present invention, so that it provides the appropriate data needed for reconstruction. As a result, compatible data may be obtained for the same frexel or frexels on a person at a current time and at a previous time and may be compared efficiently for reconstruction. This data may comprise reflectance and topographical data mapped for the same frexel and the same set of features contained in the frexel. Moreover it may be represented in the same data format, so that it may be easily used for reconstruction. This digital image 702 may represent a prior appearance of the person, for example from when the person was younger, healthier or otherwise more attractive.

If a patient's left eyebrow needs to be reconstructed, for example, a digital image 702 may be used that has been previously captured about that patient and stored in storage 250, and that shows the patient's left eyebrow. A woman who has stored a model digital image 702 of her face at age 20 may use that digital image 702 years later, for example when she is 50, as the basis for enhancements with RMAs throughout her face. The same woman could also choose to use as a basis for reconstruction a previous image of herself when she received a special makeup look from a professional makeup artist.

Topographic aspects of features can also be reconstructed to degrees. For example, dark hollows under eyes and below cheekbones can be lightened to make a face appear younger and healthier.

In another embodiment, multiple previous digital images of the person may be used to derive a digital image 702, useful for reconstruction, for example by averaging the relevant values of the multiple digital images. In addition, a current frexel may be reconstructed by using data from different but relevant frexels. For example, a frexel representing a point on a cheek may be reconstructed on the basis of previous images 702 showing adjacent frexels or frexels on different points of the body.

In still another embodiment, a computer display 102 (not shown) and interface 104 (not shown), for example a keyboard, may be used to allow a consumer to select a stored digital image 702, or elements from that image 702 or from multiple stored images, to derive a basis for one or more reconstructions, as will be evident to those skilled in the art.

In other embodiments, the digital image 702 may be created remotely and transferred to computing environment 100 by any method known to those skilled in the art or not yet known. For example, it may be sent over the Internet from a remote computer to computing environment 100. It may be loaded onto computing environment 100 by means of a diskette. It may also be transferred through wireless technology, as well as by many other means.

Alternate Embodiments of Reconstruction System

Figure 3:
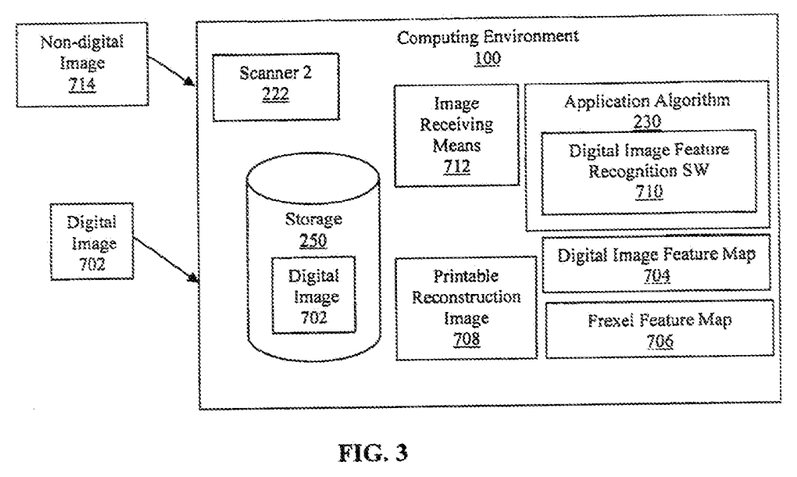
FIG. 3 is a block diagram that illustrates a reconstruction system comprising additional means of obtaining prior digital images.

FIG. 3 illustrates other embodiments in which the system comprises means for incorporating images not created by the system and method of the present invention and not previously explained above, which can be used as bases for reconstruction.

In one embodiment, image receiving means 712 enable the application system 200, shown in FIG. 2, to receive at least one digital image 702 of the person whose appearance is to be reconstructed so that digital image 702 can be stored in storage 250. For example, the digital image 702 may be a scanned image made from a photograph, painting, drawing, or other form of image. Or it may a digitally created image, such as an image captured by a digital camera, cell phone, or video camera, or an image generated on a computer.

This digital image 702 may represent not only a prior appearance of the person but the way the person would like to be seen. For example, the person might want to look like his or her appearance in an idealized drawing, an enhanced photograph, or a computer-generated image. These idealized images may be created by the person or someone working on the person's behalf, such as an artist or a makeup designer.

The digital image 702 may be received by the application system 200 by any of multiple image receiving means 712, shown in FIG. 3, known and not yet known. For example, it may be sent to the application system 200, shown in FIG. 2, by e-mail and read automatically by an application program. It may be loaded from a diskette or other storage device and read by an appropriate storage device reader. Moreover, it may be created by a device or software application attached to the application system 200, such as a digital camera or computer graphics program, and automatically stored by software in storage 250.

Moreover, multiple digital images 702 may be received by the application system 200 to derive a single model for reconstruction. For example, the application algorithm 230 can average multiple digital images 702 to derive more representative values for features in the captured digital data, their locations, and their reflectance patterns, to improve the quality of the printable reconstruction image 708.

Another embodiment comprises scanner 2 222, shown in FIG. 3, so that a non-digital image 714 may be scanned and digitized to create a digital image 702 that can be stored in storage 250, for use as a model for reconstruction.

To use images created through other methods, the present invention employs digital image feature recognition software 710 that identifies features in one or more received digital images 702. In an embodiment, this digital image feature recognition software 710 employs the techniques for the analysis of reflectance patterns explained in detail above, but applied to digital images. In other embodiments, it may use other techniques for feature recognition, for example Optasia™, the model-based feature-recognition platform developed by Image Metrics, Plc. The "Technical White Paper" on the Image Metrics website states that, "The Optasia engine can perform rapid model-to-image matching regardless of the model type, including those with high-frequency elements such as texture." These other techniques may be used in combination with the techniques for the analysis of reflectance patterns explained above or independently of them.

The digital image feature recognition software 710 is used to create a digital image feature map 704 that identifies features in the digital image 702, their locations, and their reflectance patterns.

The application algorithm 230 in turn creates a frexel feature map 706 from data captured for the person scanned, as explained above. The frexel feature map 706 identifies features in that captured data, their locations, and their reflectance patterns.

The application algorithm 230 then compares the analogous information in the digital image feature map 704 and the frexel feature map 706 and uses the data in the digital image feature map 704 as a model to reconstruct the data in the frexel feature map 706. In an embodiment, this reconstruction can be accomplished by subtracting the frexel values from the analogous digital image values to derive the values of a reconstruction image.

For example, an eyebrow that has become fainter in the frexel feature map 706 may be reconstructed, with pixel-level precision, from a darker eyebrow present in the digital image feature map 704. Skin discolored from burns can be altered to more of its previous color.

The application algorithm 230 uses this reconstruction to define a printable reconstruction image 708 that is used as a basis to apply an RMA to an area of skin 302, typically by inkjet printing, as explained above.

Enhancement System for Changing a First Person's Appearance Based on a Digital Image of a Second Person In an embodiment, the digital image 702 shown in FIG. 1 may be that of another person obtained through the system and method of the present invention, so that it provides the appropriate data needed for the enhancements to be made to the first person.

FIG. 1 also illustrates an embodiment of a system for changing the appearance of features using the cosmetic system explained with reference to FIG. 48 in the cross-referenced application U.S. 60/889,298. In this embodiment, the digital image 702 generally represents a second person whose appearance is more desirable for some purpose than the appearance of the first person. It may, for example, represent a second person who is younger, healthier or otherwise more attractive than the first person. If a first person's eyebrows are too light and lack an attractive shape, for example, a model digital image 702 of an actress with dark and well arched eyebrows may be used, when that model digital image 702 has been previously captured and stored in storage 250. Thus, a printable enhancement image 234 may be calculated and applied to the first person to morph the first person's eyebrows so that they look more like the second person's eyebrows.

For example, the distinctive arch of Nicole Kidman's eyebrow can be used as a model to enhance millions of girls next door by making their eyebrows of more arched. Or Catherine Zeta Jones's olive complexion, individual beauty marks, and full crimson lips can lend those girls a degree of her special charm.

On the other hand, model digital image 702 may represent a second person whose appearance is older and more responsible looking that the first person's, for example for the purpose of a job interview when the first person is very young and wants to look more mature.

The model digital image 702 may further represent a particular kind of appearance of any second person desired to serve as a model for the enhancements to the first person. For example, the model digital image 702 may be one of Nicole Kidman made up to have a special look for a formal event.

Filtering techniques may be used to determine the degree of similarity to be achieved. With no filtering, a very close resemblance between the second and first person may be achieved, depending on the original similarity between the two people. A higher degree of filtering may achieve a softer suggestion of similarity.

Topographic aspects of features can also be enhanced to degrees. On the first person's face, for example, cheekbones can be darkened to make them appear more like those of a second person with prominent, attractive cheekbones.

In another embodiment, multiple digital images of the second person may be used to derive a model digital image 702, useful for enhancements, for example by averaging the relevant values of those images. In addition, a frexel on the first person may be enhanced by using data from different but relevant frexels on the second person. For example, a frexel representing a point on a cheek on a first person may be enhanced on the basis of one or more model digital images 702 showing frexels or frexels on different points of the body of the second person.

In still another embodiment, a computer display 102 (not shown) and an interface 104 (not shown), for example a keyboard, may be used to allow a first person to select a stored model digital image 702 of a second person, or elements from that model digital image 702 or from multiple stored images, to derive a basis for one or more enhancements, as will be evident to those skilled in the art.

In other embodiments, the digital image 702 may be created remotely on a first instance of the present invention and transferred by any method, known to those skilled in the art or not yet known, to computing environment 100, which represents a second instance of the present invention. For example, it may be sent over the Internet from a remote computer to computing environment 100. It may be loaded onto computing environment 100 by means of a diskette. It may also be transferred through wireless technology, as well as by many other means.

Figure 4:
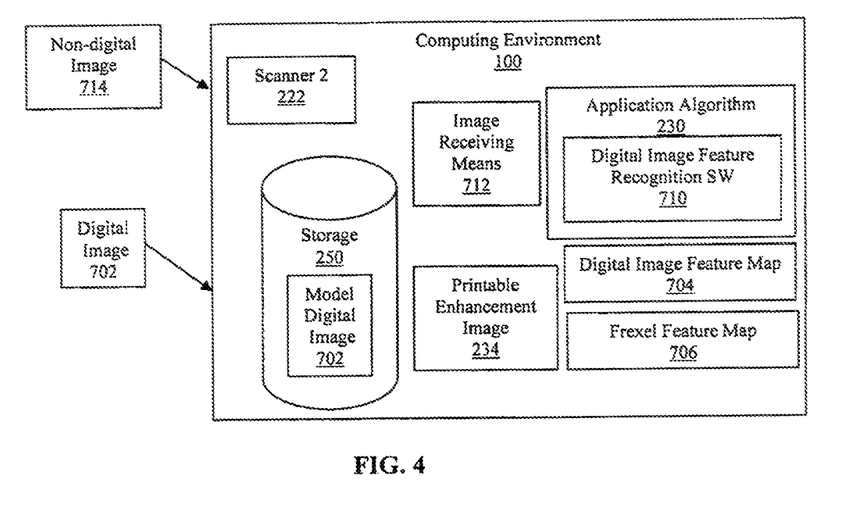
FIG. 4 is a block diagram that illustrates an enhancement system comprising additional means of obtaining a digital image of a second person.

FIG. 4 illustrates other embodiments in which the system comprises means for incorporating images not created by the system and method of the present invention to create a printable enhancement image 234. The elements shown in FIG. 4 are explained above in connection with FIG. 3.

Description of Embodiment—Reconstruction Example

Figure 5:
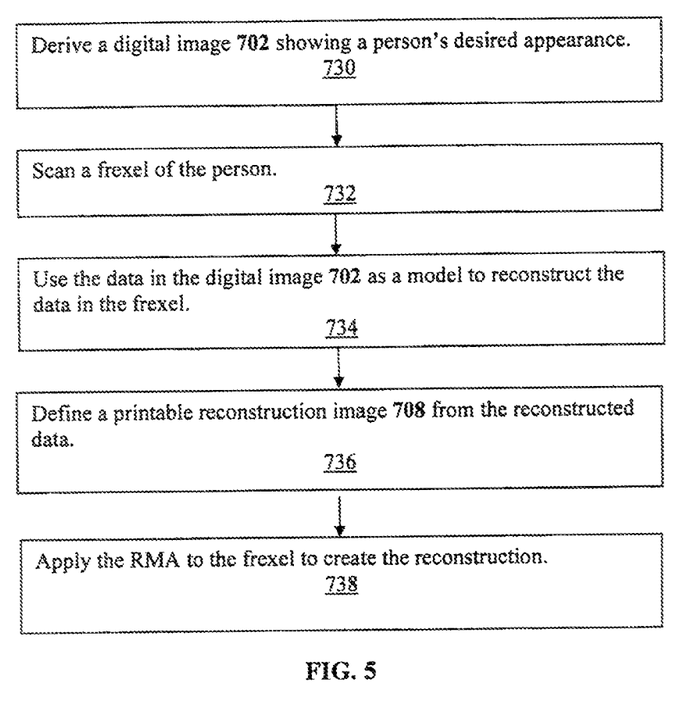
FIG. 5 is a flow chart that illustrates a process for reconstructing the appearance of human features based on a digital image obtained through the present invention.

FIG. 5 illustrates an embodiment of a process for reconstruction using the system shown in FIG. 2.

Step 730 in FIG. 5—Derive a digital image 702 showing a person's desired appearance.

As explained above, the digital image 702 may have been stored previously by application system 200, shown in FIG. 2. In addition, it can be derived from elements of one or multiple digital images stored previously, for example through averaging them.

Step 732 in FIG. 5—Scan a frexel of the person.

The application system 200, shown in FIG. 2 and explained in detail above, scans a frexel of the person.

Step 734 in FIG. 5—Use the data in the digital image 702 as a model to reconstruct the data in the frexel.

The application algorithm 230, shown in FIG. 2, compares the analogous information in the digital image 702 and in the frexel and uses the data in the digital image 702 as a model to reconstruct the data in the frexel. For example, this can be done by subtracting the frexel values from the analogous digital image values.

Step 736 in FIG. 5—Define a printable reconstruction image 708 from the reconstructed data.

The reconstructed values derived in Step 734 are treated as a printable reconstruction image 708.

Step 738 in FIG. 5—Apply the RMA to the frexel to create the reconstruction.

The application system 200, shown in FIG. 2, applies the RMA to the frexel, typically by inkjet printing, to accomplish the desired reconstruction.

Description of Embodiment—Using Images Created by Other Methods

Figure 6:
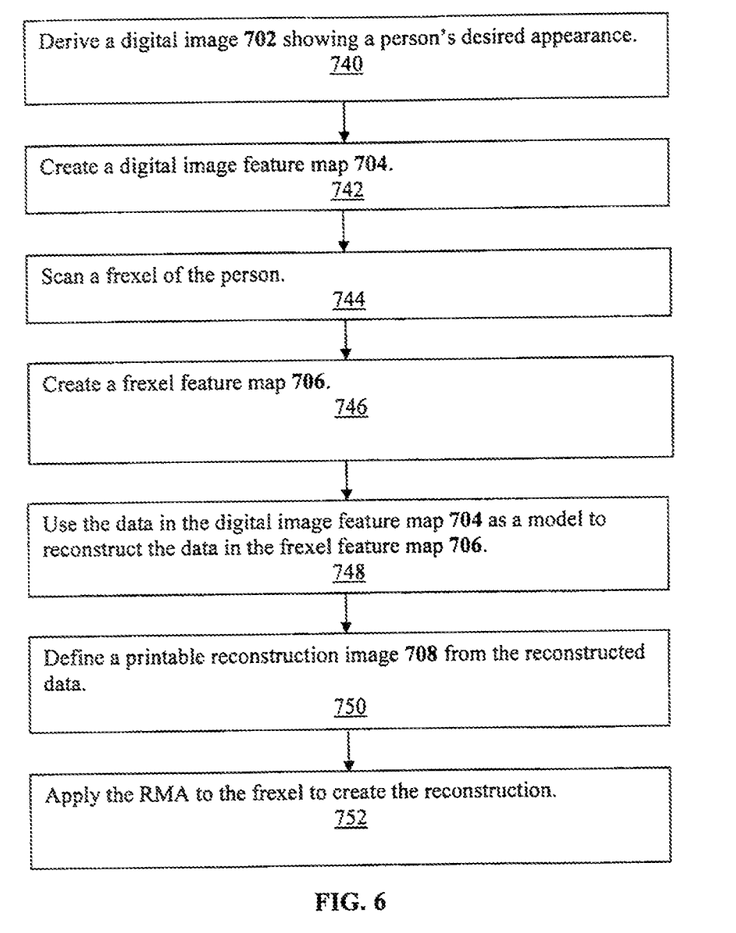
FIG. 6 is a flow chart that illustrates a process for reconstructing the appearance of human features based on a digital image obtained through another source than the present invention.

FIG. 6 illustrates an embodiment of a process for reconstruction using images not obtained by the general system and method of the present invention described above.

Step 740 in FIG. 6—Derive a digital image 702 showing a person's desired appearance.

As explained above, the digital image 702 can be received by the application system 200 shown in FIG. 2, or created by scanning a non-digital image 714, shown in FIG. 3. It can also be derived from multiple digital images, for example through averaging them. It may represent a prior image of the person or an image of how the person would like to be seen, for example one designed by a makeup artist.

Step 742 in FIG. 6—Create a digital image feature map 704.

The digital image feature recognition software 710, shown in FIG. 3, creates a digital image feature map 704 that identifies features in the digital image 702, their locations, and their reflectance patterns.

Step 744 in FIG. 6—Scan a frexel of the person.

The application system 200, shown in FIG. 2 and explained above, scans a frexel of the person.

Step 746 in FIG. 6—Create a frexel feature map 706.

The application algorithm 230, shown in FIG. 3, creates a frexel feature map 706 from data captured for the person scanned. The frexel feature map 706 identifies features in that captured data, their locations, and their reflectance patterns.

Step 748 in FIG. 6—Use the data in the digital image feature map 704 as a model to reconstruct the data in the frexel feature map 706.

The application algorithm 230, shown in FIG. 3, compares the analogous information in the digital image feature map 704 and in the frexel feature map 706 and uses the data in the digital image feature map 704 as a model to reconstruct the data in the frexel feature map 706. For example, this can be done by subtracting the frexel values from the analogous digital image values.

Step 750 in FIG. 6—Define a printable reconstruction image 708 from the reconstructed data.

The reconstructed values derived in Step 748 are treated as a printable reconstruction image 708.

Step 752 in FIG. 6—Apply the RMA to the frexel to create the reconstruction.

The application system 200, shown in FIG. 2, applies the RMA to the frexel, typically by inkjet printing, to accomplish the desired reconstruction.

Advantages of Reconstruction

The advantages of the reconstruction system and method described above are that it enables RMAs to be applied more automatically and more precisely, at the pixel level, to reconstruct the appearance of people's features, based on the appearance of those features in digital images.

Alternate Reconstruction Embodiments

In addition, this process may be usefully applied to other substances besides RMAs. For example human skin and artificial reconstruction materials may be applied.

Figure 7:
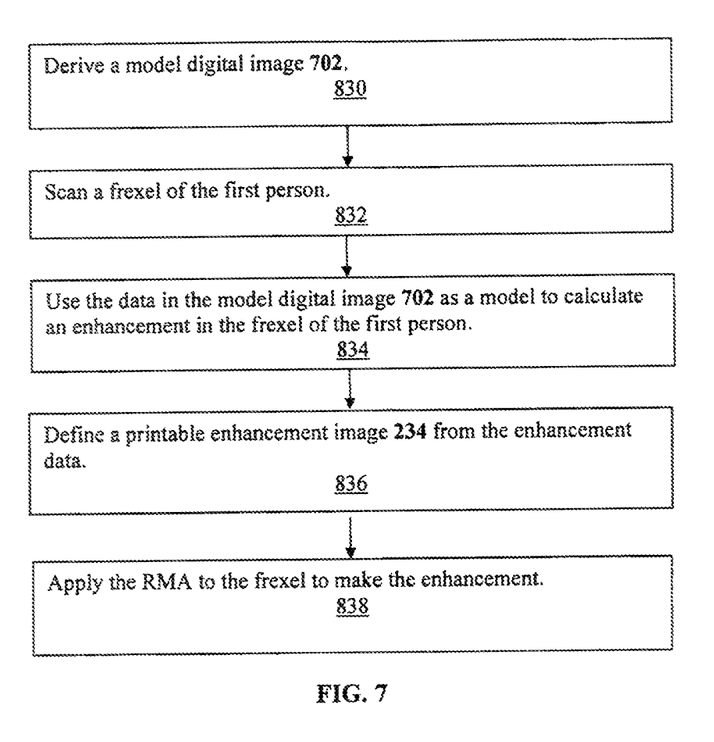
FIG. 7 is a flow chart that illustrates a process for automatically enhancing a person's appearance based on the appearance of a second person based on a digital image obtained through the present invention.

Description of Embodiment—Process for Enhancing a First Person's Features Based on a Digital Image of a Second Person FIG. 7 illustrates an embodiment of a process for enhancement of a first person's features based on a digital image of a second person.

Step 830 in FIG. 7—Derive a model digital image 702.

As explained above, the model digital image 702 may be created by the application system 200 shown in FIG. 1. For example, it may represent a digital image of an actress with a special look designed by a makeup artist, captured by the system and method of the present invention. It may also received by the application system 200 from any of multiple sources, and it may be derived from multiple images, for example through averaging them.

Step 832 in FIG. 7—Scan a frexel of the first person.

The application system 200, shown in FIG. 1 and explained in detail above, scans a frexel of the first person.

Step 834 in FIG. 7—Use the data in the model digital image 702 as a model to calculate an enhancement in the frexel of the first person.

The application algorithm 230, shown in FIG. 1, compares the analogous information in the model digital image 702 and in the frexel of the first person and uses the data in the model digital image 702 as a model to enhance the data in the frexel of the first person. For example, this can be done by subtracting the frexel values from the analogous model digital image values. As explained above, the values of the enhancement image may be filtered by a percentage to prevent exact copying of the model digital image 702.

Step 836 in FIG. 7—Define a printable enhancement image 234 from the enhancement data.

The enhancement values derived in Step 734 are treated as a printable enhancement image 234.

Step 838 in FIG. 7—Apply the RMA to the frexel to make the enhancement.

The application system 200, shown in FIG. 1, applies the RMA to the frexel on the first person, typically by inkjet printing, to accomplish the desired enhancement.

Figure 8:
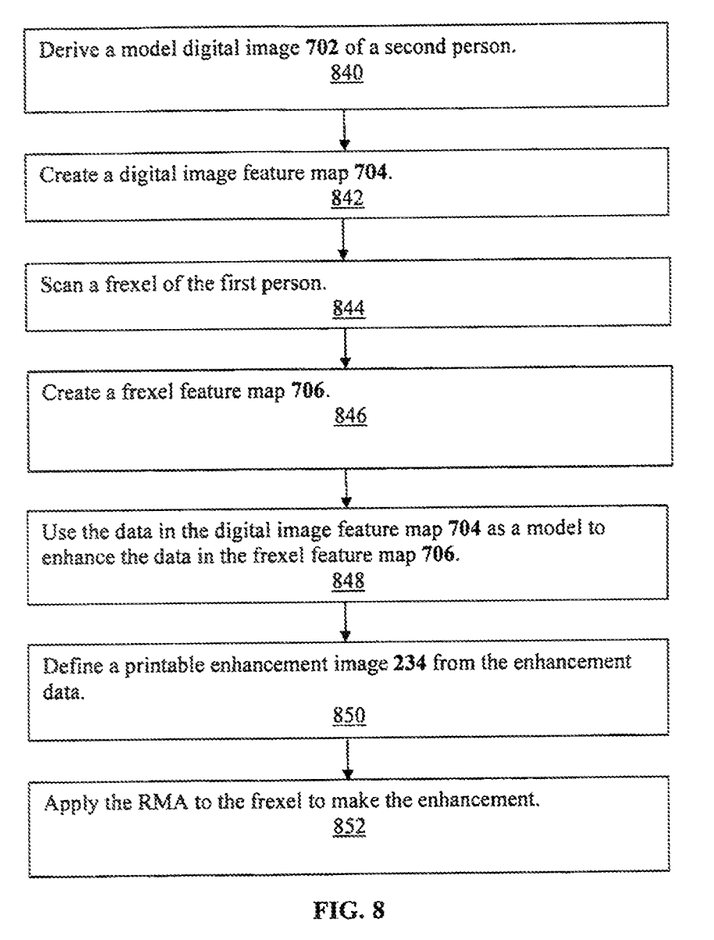
FIG. 8 is a flow chart that illustrates a process for automatically enhancing a person's appearance based on the appearance of a second person based on a digital image obtained through another source than the present invention.

Description of Embodiment—Enhancement Process with Images Created by Other Methods FIG. 8 illustrates an embodiment of a process for enhancement of a first person using images of a second person that are not created by the general system and method of the present invention described above.

Step 840 in FIG. 8—Derive a model digital image 702 of a second person.

As explained above, the model digital image 702 can be received by the application system 200 shown in FIG. 1 or created by scanning a non-digital image 714, shown in FIG. 4. It can also be derived from multiple digital images, for example through averaging them.

Step 842 in FIG. 8—Create a digital image feature map 704.

The digital image feature recognition software 710, shown in FIG. 4, creates a digital image feature map 704 that identifies features in the model digital image 702, their locations, and their reflectance patterns.

Step 844 in FIG. 8—Scan a frexel of the first person.

The application system 200, shown in FIG. 1 and explained in detail above, scans a frexel of the first person.

Step 846 in FIG. 8—Create a frexel feature map 706.

The application algorithm 230, shown in FIG. 4, creates a frexel feature map 706 from data captured for the first person. The frexel feature map 706 identifies features in that captured data, their locations, and their reflectance patterns.

Step 848 in FIG. 8—Use the data in the digital image feature map 704 as a model to enhance the data in the frexel feature map 706.

The application algorithm 230, shown in FIG. 4, compares the analogous information in the digital image feature map 704 and in the frexel feature map 706 and uses the data in the digital image feature map 704 as a model to make an enhancement in the frexel feature map 706. For example, this can be done by subtracting the frexel values from the analogous digital image values. As explained above, the values of the enhancement image may be filtered by a percentage to prevent exact copying of the model digital image 702.

Step 850 in FIG. 8—Define a printable enhancement image 234 from the enhancement data.

The enhancement values derived in Step 848 are treated as a printable enhancement image 234.

Step 852 in FIG. 8—Apply the RMA to the frexel to make the enhancement.

The application system 200, shown in FIG. 1, applies the RMA to the frexel, typically by inkjet printing, to accomplish the desired enhancement.

It will be apparent to those skilled in the art that different embodiments of the present invention may employ a wide range of possible hardware and of software techniques. The scope of the current invention is not limited by the specific examples described above.

What is claimed is:

1. A system for changing an appearance of at least one frexel within a region of human skin of a first person, the system comprising:

at least one reflectance modifying agent application element, the reflectance modifying agent application element being operable to selectively apply one or more reflectance modifying agents to frexels of the human skin; and a computing environment that is coupled to the at least one reflectance modifying agent application element and that is operable to perform operations comprising:
  obtaining a digital image feature map that provides data regarding at least one desired feature,
  scanning the region of human skin to generate a frexel feature map that identifies at least one feature associated with the first person,
  comparing the digital feature map and the frexel feature map to generate a reconstruction image, the reconstruction image comprising enhancement data, and
  instructing the at least one reflectance modifying agent application element to apply the one or more reflectance modifying agents to the at least one frexel based on the enhancement data such that the at least one feature associated with the first person appears more like the at least one desired feature.

2. The system of claim 1, wherein the digital image feature map is generated based on a first image showing one or more features desired for the region of the human skin.

3. The system of claim 2, wherein the first image comprises a digital image of the first person.

4. The system of claim 2 wherein the first image comprises a digital image of a region of human skin of a second person.

5. The system of claim 2, wherein the first image comprises reflectance and topographical data.

6. The system of claim 1 wherein comparing the digital feature map and the frexel feature map to generate a reconstruction image comprises:
  using the digital feature map as a model to derive enhancement values; and
  generating the reconstruction image as an enhancement image based on the enhancement values.

7. The system of claim 1 wherein the computing environment is further operable to perform operations comprising:
  recognizing features in digital images;
  creating the digital image feature map from a digital image;
  creating the frexel feature map; and
  generating the reconstruction image as an enhancement image based on a difference between values in the digital image feature map and values in the frexel feature map.

8. The system of claim 7, wherein generating the reconstruction image comprises applying a filtering ratio to the digital image feature map.

9. The system of claim 1, wherein the digital image feature map is based on a plurality of digital images.

10. The system of claim 9, wherein the digital image feature map comprises data provided as an average of data across the plurality of digital images.

11. The system of claim 1, wherein generating the reconstruction image comprises applying a filter to a difference between the digital image feature map and the frexel feature map.

12. A method for changing an appearance of at least one frexel within a region of human skin of a first person, the method comprising:
  obtaining a digital image feature map that provides data regarding at least one desired feature;
  scanning the region of human skin to generate a frexel feature map that identifies at least one feature associated with the first person;
  comparing the digital feature map and the frexel feature map to generate a reconstruction image, the reconstruction image comprising enhancement data; and
  instructing at least one reflectance modifying agent application element to apply one or more reflectance modifying agents to the at least one frexel based on the enhancement data such that the at least one feature associated with the first person appears more like the at least one desired feature.

13. The method of claim 12, wherein the digital image feature map is generated based on a first image showing one or more features desired for the region of the human skin.

14. The method of claim 13, wherein the first image comprises a digital image of the first person.

15. The method of claim 13, wherein the first image comprises a digital image of a region of human skin of a second person.

16. The method of claim 13, wherein the first image comprise reflectance and topographical data.

17. The method of claim 12, wherein comparing the digital feature map and the frexel feature map to generate a reconstruction image comprises:
  using the digital feature map as a model to derive enhancement values; and
  generating the reconstruction image as an enhancement image based on the enhancement values.

18. The method of claim 12, further comprising:
  recognizing features in digital images;
  creating the digital image feature map from a digital image;
  creating the frexel feature map; and
  generating the reconstruction image as an enhancement image based on a difference between values in the digital image feature map and values in the frexel feature map.

19. The method of claim 18, wherein generating the reconstruction image comprises applying a filtering ratio to the digital image feature map.

20. The method of claim 12, wherein the digital image feature map is based on a plurality of digital images.

21. The method of claim 20, wherein the digital image feature map comprises data provided as an average of data across the plurality of digital images.

22. The method of claim 12, wherein generating the reconstruction image comprises applying a filter to a difference between the digital image feature map and the frexel feature map.

23. The method of claim 12, wherein the reflectance modifying agent application element is operable to selectively apply the one or more reflectance modifying agents to frexels of the human skin.

* * * * *

UNITED STATES PATENT AND TRADEMARK OFFICE
CERTIFICATE OF CORRECTION

PATENT NO. : 8,582,830 B2  
APPLICATION NO. : 13/476320  
DATED : November 12, 2013  
INVENTOR(S) : Albert D. Edgar, David C. Iglehart and Rick B. Yeager Page 1 of 1

It is certified that error appears in the above-identified patent and that said Letters Patent is hereby corrected as shown below:

Title Page, Item (54) and in the Specification, column 1, line 3 (Title), delete "PERSONS" and insert -- PERSON'S --, therefore.

Title Page 2, column 2 (Other Publications), entry 4, delete "füOptik" and insert -- für Optik --, therefore.

Signed and Sealed this  
Twenty-ninth Day of April, 2014

Michelle K. Lee  
*Deputy Director of the United States Patent and Trademark Office*